(12) United States Patent
Martin

(10) Patent No.: US 7,845,176 B2
(45) Date of Patent: Dec. 7, 2010

(54) MODE STRUT AND DIVERGENT FLAP INTERFACE

(75) Inventor: Keegan M. Martin, Stafford Springs, CT (US)

(73) Assignee: United Technologies Corporation, Hartford, CT (US)

( * ) Notice: Subject to any disclaimer, the term of this patent is extended or adjusted under 35 U.S.C. 154(b) by 931 days.

(21) Appl. No.: 11/688,401

(22) Filed: Mar. 20, 2007

(65) Prior Publication Data

US 2008/0230629 A1 Sep. 25, 2008

(51) Int. Cl.
*F02K 1/00* (2006.01)
(52) U.S. Cl. .................................. 60/770; 239/265.39
(58) Field of Classification Search ............ 239/265.19, 239/265.39, 265.33, 265.37; 60/770, 771
See application file for complete search history.

(56) References Cited

U.S. PATENT DOCUMENTS

| 4,049,199 A | * | 9/1977 | Nightingale | 239/265.39 |
|---|---|---|---|---|
| 4,141,501 A | * | 2/1979 | Nightingale | 239/265.39 |
| 4,194,692 A | * | 3/1980 | Dickenson | 239/265.39 |
| 5,082,182 A | * | 1/1992 | Bruchez et al. | 239/265.35 |
| 5,101,533 A | * | 4/1992 | Stenger et al. | 16/340 |
| 5,174,502 A | * | 12/1992 | Lippmeier et al. | 239/265.41 |
| 5,232,158 A | * | 8/1993 | Barcza | 239/265.35 |
| 5,239,815 A | * | 8/1993 | Barcza | 60/228 |
| 5,245,823 A | * | 9/1993 | Barcza | 60/228 |
| 5,285,637 A | * | 2/1994 | Barcza | 239/265.35 |
| 5,680,755 A | * | 10/1997 | Hauer et al. | 60/266 |
| 5,775,639 A | * | 7/1998 | Fage | 244/110 B |
| 5,806,302 A | * | 9/1998 | Cariola et al. | 60/204 |
| 5,842,643 A | * | 12/1998 | Lippmeier | 239/265.39 |
| 5,893,518 A | * | 4/1999 | Bruchez et al. | 239/265.39 |
| 6,415,599 B1 | * | 7/2002 | Ausdenmoore et al. | 60/230 |
| 2008/0098742 A1 | * | 5/2008 | Sadil et al. | 60/770 |

* cited by examiner

*Primary Examiner*—William H Rodríguez
(74) *Attorney, Agent, or Firm*—Carlson, Gaskey & Olds, P.C.

(57) ABSTRACT

In one example, a gas turbine engine includes an exhaust nozzle. The exhaust nozzle includes a flap supported relative to a static structure by a strut. The flap includes a backbone providing a slot. A slider interconnects a strut end to the backbone. In one example, the slider includes a body that is slidingly received within the slot. A boss extends from the body and provides a first feature. The strut end includes a second feature that cooperates with the first feature to prevent relative rotation between the slider and a portion of the strut end.

14 Claims, 2 Drawing Sheets

MODE STRUT AND DIVERGENT FLAP INTERFACE

This invention was made with government support with the United States Navy under Contract No.: N00019-02-C-3003. The government therefore has certain rights in this invention.

BACKGROUND

This application relates to a gas turbine engine with an exhaust nozzle. More particularly, the application relates to an interface between a divergent flap and mode strut of the exhaust nozzle.

Some gas turbine engines include an exhaust nozzle for varying a nozzle exit area to control thrust. In one type of exhaust nozzle, multiple flaps are arranged circumferentially about the nozzle and are moved to vary the nozzle exit area in response to an input from one or more actuators. In one type of arrangement, each flap is supported relative to a static structure by a mode strut or "strut". The flap includes a backbone having a slot that receives a slider supported by a strut end. The slider has an elongated body that is received by and slides relative to the slot. A cylindrical boss extends from the body and is received in a cylindrical hole of the strut end.

During operation of the exhaust nozzle, the body slides up and down in the slot and the boss rotates within the hole in the strut end. This has resulted in wear and galling between the boss and strut end, resulting in accelerated wear and reduced life of the strut and slider. The hole becomes elongated, and the wall thickness of the boss thins more rapidly than desired. What is needed is an interface between the strut and slider that reduces wear and extends the life of the mode strut and slider.

SUMMARY

In one example, a gas turbine engine includes an exhaust nozzle. The exhaust nozzle includes a flap supported relative to a static structure by a strut. The flap includes a backbone providing a slot. A slider interconnects a strut end to the backbone. In one example, the slider includes a body that is slidingly received within the slot. A boss extends from the body and provides a first feature. The strut end includes a second feature that cooperates with the first feature to prevent relative rotation between the slider and a portion of the strut end.

In one example, the strut end includes a spherical bearing having an elongated opening. The boss includes a surface that is shaped complimentarily to the elongated opening to interlock with the bearing opening in a slip fit relationship. In operation, the body of the slider moves within the slot provided by the backbone, and the boss is rotationally fixed relative to the bearing so that there is no wear between the slider and strut end as they rotate relative to one another.

These and other features of the application can be best understood from the following specification and drawings, the following of which is a brief description.

DETAILED DESCRIPTION OF THE PREFERRED EMBODIMENT

Figure 1:
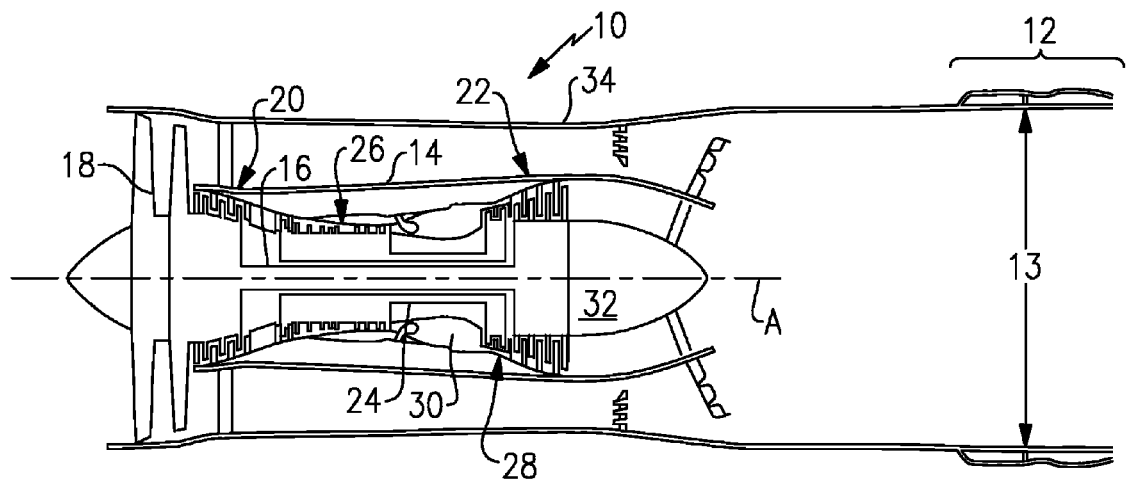
FIG. 1 is a schematic view of an example turbofan engine.

A turbofan engine 10 is shown schematically in FIG. 1. As known, a fan section moves air and rotates about an axis A. A compressor section, a combustion section, and a turbine section are also centered on the axis A. FIG. 1 is a highly schematic view, however, it does show the main components of the gas turbine engine. Further, while a particular type of gas turbine engine is illustrated in this figure, it should be understood that the claim scope extends to other types of gas turbine engines.

The engine 10 includes an exhaust nozzle 12 for varying the nozzle exit area 13 to achieve a desired thrust. The engine 10 includes a core 14 housing a low spool 16. A fan 18, low pressure compressor 20 and low pressure turbine 22 are mounted on the low spool 16. A high spool 24 is arranged coaxially relative to the low spool 16. A high pressure compressor 26 and high pressure turbine 28 are mounted on the high spool 24. A combustor 30 is arranged between the high pressure compressor 26 and high pressure turbine 28.

Air entering the core 14 is compressed for combustion and expanded, as is known, before entering an exit provided between the core 14 and a tail cone 32. A bypass flow path is provided between the core 14 and a fan 34. The flows from the bypass flow path and core 14 exit through the exhaust nozzle 12.

Figure 2:
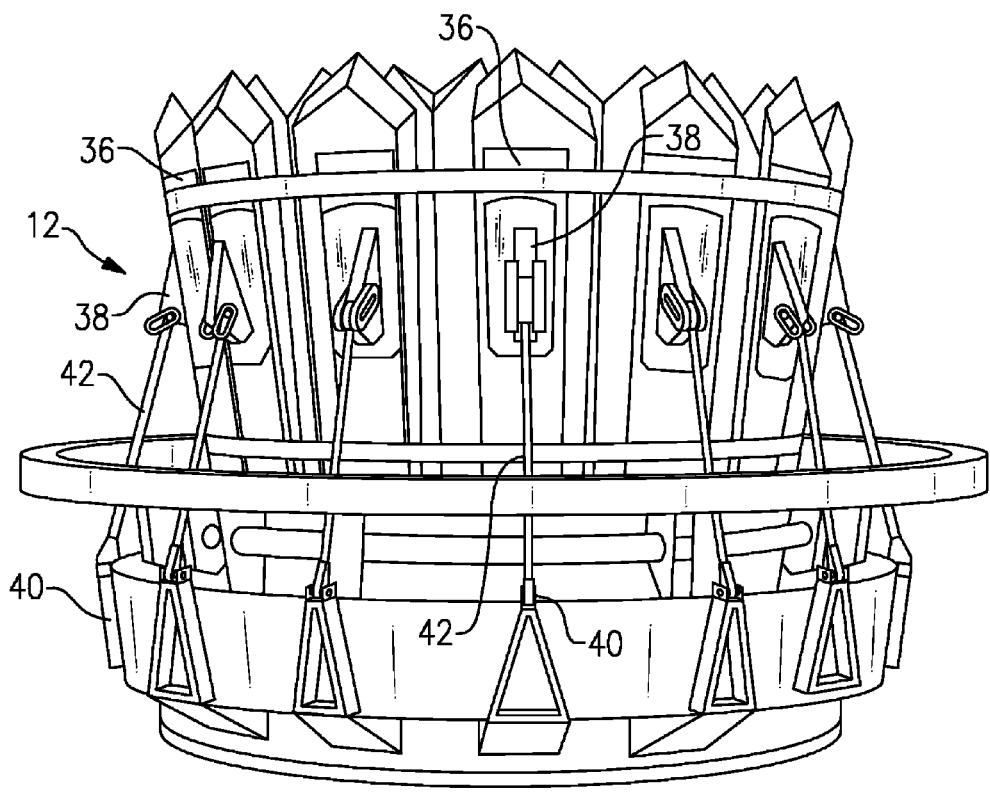
FIG. 2 is a side perspective view of an example exhaust nozzle.
Figure 3:
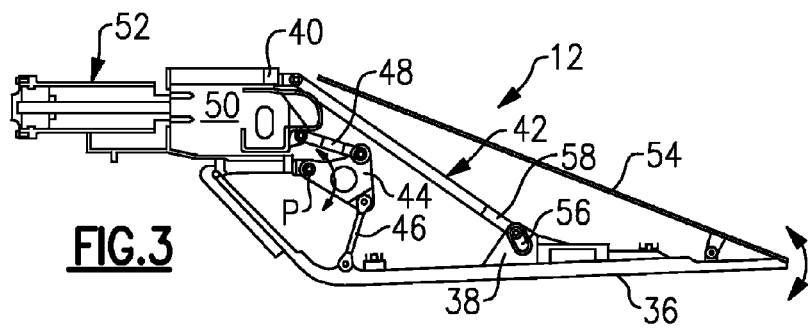
FIG. 3 is a cross-sectional view of a portion of the exhaust nozzle shown in FIG. 2.

Referring to FIGS. 2 and 3, the exhaust nozzle 12 includes multiple divergent flaps 36 arranged circumferentially about the fan 34 to provide a variable nozzle exit area. In one example, each flap 36 includes a backbone 38, which is used to support the flap 36 relative to static structure 40 using a strut 42.

Referring to FIG. 3, a fulcrum 44 is supported relative to the static structure 40 at a pivot P. A link 46 interconnects the fulcrum 44 to a forward portion of the flap 36. A rod 48 is interconnected between the fulcrum 44 and a synchronizing ring 50. An actuator 52 is interconnected to the synchronizing ring 50 to open and close one or more flaps 36 in a desired manner in response to a command from a controller (not shown). An external flap 54 is secured to the flap 36 to shield the components described above.

Figure 6:
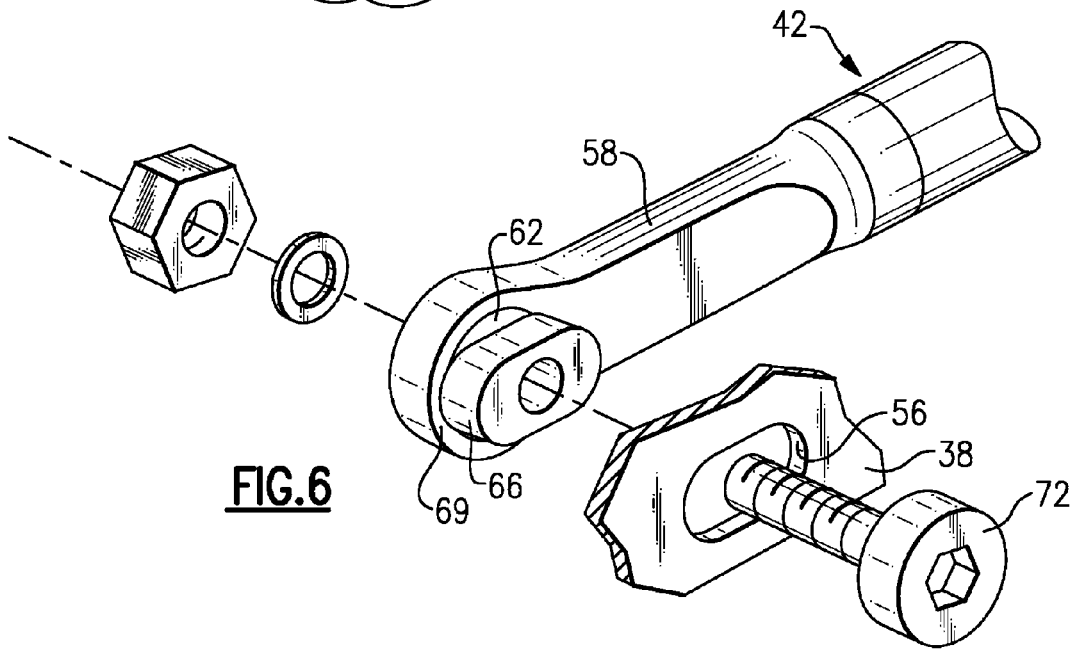
FIG. 6 is a partially exploded perspective view of the strut, slider, and a backbone to which the strut is interconnected.

Referring to FIGS. 3 and 6, the backbone 38 includes an elongated slot 56 that receives a slider 66. More particularly, the strut 42 includes a strut end 58 that supports the slider 66. The slider 66 includes a body 69 that is received in the slot 56 and slides relative thereto during operation of the exhaust nozzle 12.

Figure 4:
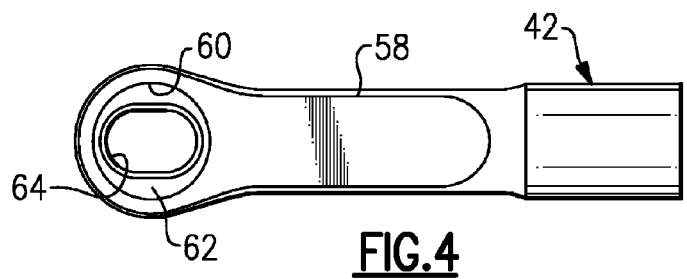
FIG. 4 is a side elevational view of a strut end.

The strut 42 and slider 66 include features that prevent relative rotation, which has resulted in wear in prior art arrangements. In one example, the strut end 58 includes an aperture 60 receiving a spherical bearing 62, as shown in FIG. 4. The spherical bearing 62 provides relatively frictionless rotation relative to the strut end 58 in one or more directions like a Heim joint. Referring to FIG. 4, the spherical bearing 62 provides an opening 64, which is elongated in the example, that provides a first feature.

Figure 5:
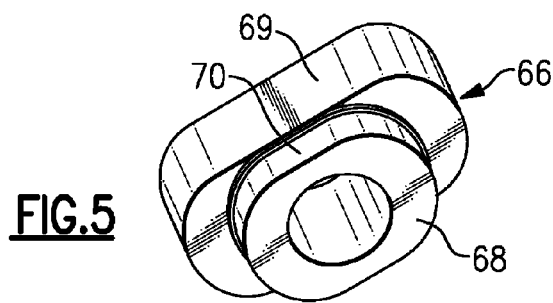
FIG. 5 is a perspective view of an example slider.

Referring to FIG. 5, the slider 66 includes a boss 68 extending from the body 69. In one example, the boss 68 provides a surface 70 that is complimentary in shape and provides a second feature that interlocks in a slip fit relationship with the first feature provided by the opening 64, thereby preventing relative rotation between the slider 66 and the spherical bearing 62. Returning to FIG. 6, a fastener 72 is schematically shown. The fastener 72 retains the body 69 within the slot 56 and prevents the strut 42 and slider 66 from decoupling from one another. It should be understood that the opening 64 may be provided by the slider 66 and the boss 68 provided by the bearing 62, for example. Further, the interlocking between the slider 66 and bearing 62 can be provided in other suitable ways and still fall within the scope of the claims.

In operation, the actuator 52 manipulates the flap 36 using the synchronizing ring 50, fulcrum 44 and associated components. The body 69 of the slider 66 slides within the slot 56. However, during this movement the slider 66 is rotationally constrained relative to the bearing 62 via the interlocking first and second features respectively provided by the opening 64 and complimentary surface 70. Instead, the bearing 62 rotates within the strut end 58. As a result, the bearing 62, which is suited for relatively friction-free rotation, avoids the frictional wear typically experienced in prior art arrangements.

The bearing 62 and slider 66 can be constructed from any suitable material. In one example, the bearing 62 is constructed from Stellite®, and the slider 66 is constructed from Waspaloy®. The strut end 58 is constructed from a nickel alloy in one example, and for example, Inconel®.

Although a preferred embodiment has been disclosed, a worker of ordinary skill in this art would recognize that certain modifications would come within the scope of the claims. For that reason, the following claims should be studied to determine their true scope and content.

What is claimed is:

1. A strut arrangement for a turbine engine exhaust nozzle comprising:
   a strut end;
   a bearing supported in the strut end providing an opening; and
   a slider including a body for cooperating with an exhaust nozzle flap, the slider including a boss extending from the body and received in the opening, the opening and the boss interlocking with one another with respective first and second features to prevent relative rotation between the bearing and slider.

2. The strut assembly according to claim 1, wherein the bearing is a spherical bearing.

3. The strut assembly according to claim 1, wherein the first and second features are non-circular in shape.

4. The strut assembly according to claim 3, wherein the opening extends through the body from a first side to a second side along an axis, the opening is elongated in a direction transverse to the axis, and the boss provides a surface that is complimentary in shape to the opening.

5. The strut assembly according to claim 1, wherein the slider is constructed from a first material and the bearing is constructed from a second material different that the first material.

6. An exhaust nozzle for a turbine engine comprising:
   a static structure;
   a flap movable relative to the static structure for varying a nozzle exit area; and
   a strut supporting the flap relative to the static structure, the flap including a backbone providing a slot receiving a slider that is configured for movement along a length of the slot, the strut including a strut end having a bearing connected to the slider with the slider constrained against rotation relative to the bearing.

7. The exhaust nozzle according to claim 6, comprising an actuator manipulating the flap between positions thereby moving the slider within the slot with the bearing rotationally fixed to the slider.

8. The exhaust nozzle according to claim 6, wherein the strut end supports the bearing which provides a first feature, and the slider includes a body received in the slot, the slider including a second feature cooperating with the first feature for preventing relative rotation between the bearing and slider.

9. The exhaust nozzle according to claim 8, wherein the bearing is a spherical bearing having an opening within which a fastener is disposed, the slider constrained against rotation relative to the bearing with the first and second features.

10. The exhaust nozzle according to claim 8, wherein the bearing includes an opening providing the first feature, and the slider includes a boss extending from the body providing a second feature received by the opening.

11. The exhaust nozzle according to claim 10, wherein the opening is elongated, and the boss provides a surface that is complimentary in shape to the opening.

12. A method of actuating an exhaust nozzle flap comprising the steps of:
    actuating a flap to a desired position;
    moving a slider within a slot provided by a portion of the flap, the slider secured to the flap by a fastener at a bearing provided on a strut end that supports the flap; and
    rotating the slider in unison with the bearing about a longitudinal axis of the fastener.

13. The strut assembly according to claim 4, wherein the boss including a hole with a fastener extending through the hole along the axis.

14. The strut assembly according to claim 3, wherein the first and second features each include a flat that engage one another to prevent relative rotation therebetween about the axis.

* * * * *